(No Model.)
W. S. O'BRIEN.
WAGON WHEEL.
No. 569,467. Patented Oct. 13, 1896.
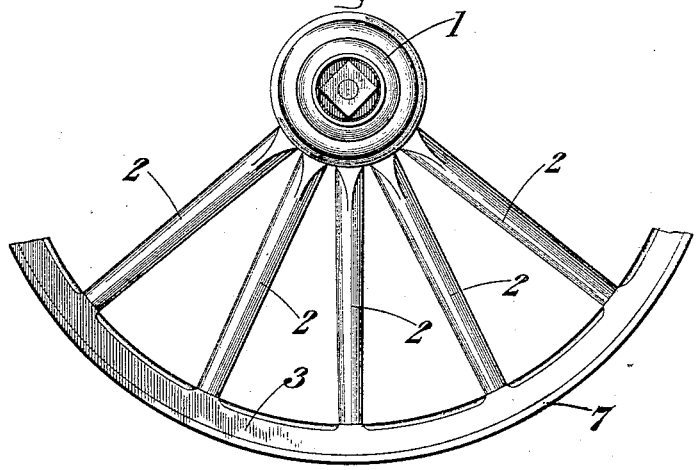
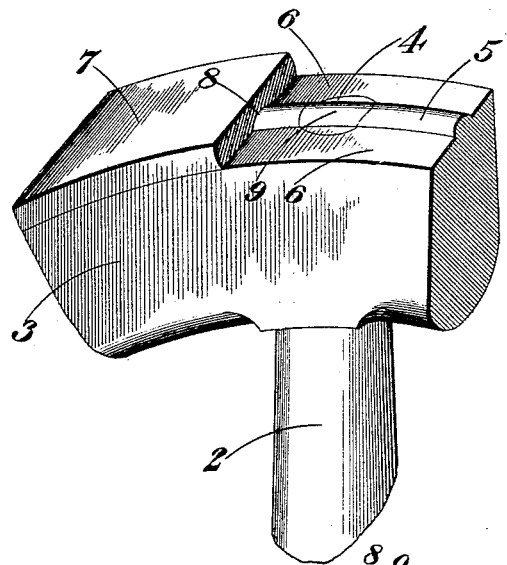
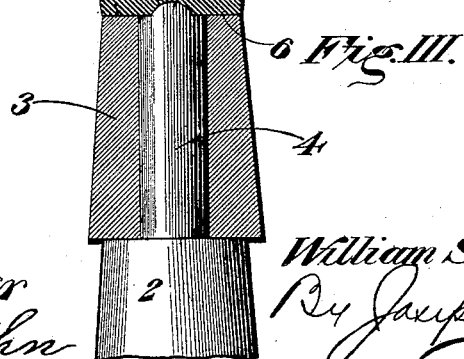
Witnesses
M. E. Fowler
Louis G. Julihn
Inventor
William S. O'Brien
By Joseph L. Atkins
Attorney

UNITED STATES PATENT OFFICE.

WILLIAM S. O'BRIEN, OF LAFAYETTE, INDIANA.

WAGON-WHEEL.

SPECIFICATION forming part of Letters Patent No. 569,467, dated October 13, 1896.

Application filed July 25, 1895. Serial No. 557,139. (No model.)

*To all whom it may concern:*

Be it known that I, WILLIAM S. O'BRIEN, of Lafayette, county of Tippecanoe, State of Indiana, have invented certain new and useful Improvements in Wagon-Wheels, of which the following is a specification, reference being had to the accompanying drawings.

The object of my invention is to produce improvements in wagon or other vehicle wheels in which the tire may be secured to the felly without the use of bolts or screws or any such part which tends to weaken the metal tire or the wooden felly.

The invention consists in the combination of a rib formed in the wood of the felly upon its periphery with an ordinary flat tire provided with a groove made to fit the rib on the felly.

It also consists in a wheel having a felly provided with a circumferential peripheral rib formed in the face of the felly itself, and preferably in a wheel in which the ends of the spokes extend entirely through the felly and constitute at regular intervals reinforcing-pieces for the felly-rib.

Heretofore attempts have been made to produce a tire which might be shrunk upon a wheel and be secured without the aid of screws, bolts, or the like, but the fruits of such attempts have been open to objection in practice, owing to defects which render them expensive or difficult to manufacture, or inefficient and without durability in use.

In the accompanying drawings, Figure I is a side elevation of a portion of a wheel, showing the tire secured in accordance with my invention. Fig. II is a perspective view of a portion of the same, showing a part of the tire removed. Fig. III is a longitudinal section through the end of one of the spokes with the felly and tire in place.

Referring to the figures on the drawings, 1 indicates an ordinary hub of any ordinary vehicle-wheel, 2 the spokes thereof, and 3 the felly. These parts may be made and assembled in any suitable and usual manner, the spokes being provided with suitable tenon ends 4, which fit into corresponding sockets or radial apertures in the felly, and preferably extending entirely through the felly. By that means a secure union between the felly and the spokes may be obtained without injuriously affecting the strength of the felly itself.

My invention comprehends the employment of a continuous rib 5, formed upon the outer periphery or tread of the felly, and preferably centrally located thereon. It is preferably but slightly elevated above the tire bearing-surfaces 6 upon each side of it, so that a tire when expanded by heat may be easily fitted over it upon the bearing-surfaces and when contracted will shrink firmly and securely in place upon it.

7 indicates a suitable form of tire to be employed in practice, its distinctive feature being that it is provided with an interior groove 8, designed to fit closely upon the rib 5 in the felly and to constitute with the rib the exclusive means for retaining the tire upon the felly when the former has been properly shrunk upon the latter.

It is well understood by one skilled in the art that the grain of the wood of the felly runs longitudinally. Consequently the rib 5, formed in its periphery, is retained upon the felly only by that force in the wood which resists cleavage. This in light vehicles would probably be sufficient to hold the tire in place, but in heavy wagons, in which the connection between the tire and felly is frequently subjected to great strain, it is desirable to reinforce the natural tenacity of the wood which exists between its fibers. For that purpose I prefer to extend the spokes entirely through the felly and to form upon their respective ends a rib 9, which constitutes a continuation of the diametrical rib $5^a$. The ends of the spokes are brought flush with the tire bearing-surfaces 6, and the diametrical ribs $5^a$ are correlative with and conform to the contour of the rib 5, which, as is apparent, is formed of segmental sections extending between the spokes. A continuous peripheral flange around the felly composed of alternate sections the fiber or grain of which extends at right angles to each other is by this means obtained, and the cross-grain of the wood of the spoke-sections of the peripheral flange is made available for retaining the tire in place, and thereby the union between the tire and felly is rendered practically inseparable under any ordinary conditions and sufficient to withstand as much wear as a union secured by the employment of bolts, screws, or the like.

In the manufacture of my wheel the hub, spokes, and felly are assembled in the usual manner. The wheel may then be centered in a lathe and the rib 5 turned upon the face of the felly. The manufacture of my improved wheel is therefore simple and inexpensive.

What I claim is—

1. In a wheel, the combination with its hub and felly provided with a flat tread, of a continuous peripheral, comparatively narrow rib, medially located upon the tread of the felly, and corresponding to the arc of a circle in cross-section, spokes having their outer ends fitting within sockets, and extending entirely through the felly, the ends of the spokes being conformable to the shape of the rib and flush with the face of the felly and rib, respectively, whereby at regular intervals the grain of the spokes crosses the grain of the rib and is exposed upon the sides of the rib so as to constitute a continuous reinforcing-rib as a means for retaining a flat grooved tire in place upon the felly, when shrunk upon the same, substantially as set forth.

2. In a wheel, the combination with its hub and felly provided with a flat tread, of a continuous peripheral, comparatively narrow rib, medially located upon the tread of the felly, and corresponding to the arc of a circle in cross-section, spokes having their outer ends fitting within sockets, and extending entirely through the felly, the ends of the spokes being conformable to the shape of the rib and flush with the face of the felly and rib, respectively, whereby at regular intervals the grain of the spokes crosses the grain of the rib and is exposed upon the sides of the rib and a flat interiorly-grooved tire fitting the rib and the tread of the felly, respectively, the opposite walls of the groove thereof making close contact with both grains of the wood exposed in the rib upon the felly and the ends of the spokes, respectively, substantially as set forth.

In testimony of all which I have hereunto subscribed my name.

WILLIAM S. O'BRIEN.

Witnesses:
JOHN F. McHUGH,
HARRY HERRMAN.